(12) United States Patent
Mahamat et al.

(10) Patent No.: US 12,166,436 B2
(45) Date of Patent: Dec. 10, 2024

(54) SYSTEM FOR PRODUCING HIGH-INTENSITY ELECTRICITY UTILIZING GRAVITATIONAL WAVES

(71) Applicants: Ali Mahamat, Saint-Genis-Poully (FR); Adam IBn Mahamat, Saint-Genis-Poully (FR); Ixham Baquitta Bith Mahamat, Saint-Genis-Poully (FR); Mairama R. Mahamat, Saint-Genis-Poully (FR); Power El-Saleh Mahamat, Saint-Genis-Poully (FR)

(72) Inventors: Ali Mahamat, Saint-Genis-Poully (FR); Adam IBn Mahamat, Saint-Genis-Poully (FR); Ixham Baquitta Bith Mahamat, Saint-Genis-Poully (FR); Mairama R. Mahamat, Saint-Genis-Poully (FR); Power El-Saleh Mahamat, Saint-Genis-Poully (FR)

(*) Notice: Subject to any disclaimer, the term of this patent is extended or adjusted under 35 U.S.C. 154(b) by 90 days.

(21) Appl. No.: 18/108,143

(22) Filed: Feb. 10, 2023

(65) Prior Publication Data

US 2024/0275312 A1    Aug. 15, 2024

(51) Int. Cl.
*H02N 99/00*     (2006.01)
*H02J 50/00*     (2016.01)

(52) U.S. Cl.
CPC ........... *H02N 99/00* (2013.01); *H02J 50/001* (2020.01)

(58) Field of Classification Search
CPC ....................................................... H02N 99/00
USPC ............................................................. 307/104
See application file for complete search history.

(56) References Cited

U.S. PATENT DOCUMENTS

| | | | |
|---|---|---|---|
| 11,608,197 B2* | 3/2023 | Kukharev | ........... H05F 7/00 |
| 2003/0114313 A1* | 6/2003 | Worsley | ...... H02N 11/006 505/180 |
| 2019/0218737 A1* | 7/2019 | Hansmann | ......... F03B 13/12 |
| 2019/0245413 A1* | 8/2019 | Tutunaru | ............ F01K 3/188 |
| 2021/0091649 A1* | 3/2021 | Tutunaru | ........... H01G 11/52 |

* cited by examiner

*Primary Examiner* — Joseph Chang
(74) *Attorney, Agent, or Firm* — Bay State IP, LLC

(57) ABSTRACT

A system for producing high-intensity electricity utilizing gravitational waves, the system (100) comprising a first quantum antenna (102) configured to capture gravitational waves, carrying the potential energy of the sun; a second quantum antenna (104) configured to capture gravitational waves, carrying the potential energy from sedentary supermassive black holes; a plasma collision roundabout (106) configured to allow collision of the gravitational waves, captured using the first quantum antenna (102) and the second quantum antenna ( ), fostering the fusion of atoms of the materials transported by each of the gravitational waves; a wave collision roundabout (108) configured to merge the gravitational waves captured using the first quantum antenna (102) and the second quantum antenna (104), to a fusion wave; a plurality of converters (110a-110n) configured to transform the intensity of the produced electric power; and a battery (112) configured to store the energy produced.

20 Claims, 10 Drawing Sheets

SYSTEM FOR PRODUCING HIGH-INTENSITY ELECTRICITY UTILIZING GRAVITATIONAL WAVES

BACKGROUND

Field of the Invention

Embodiments of the present invention generally relate to a system and method to produce high-intensity electricity and particularly to a system and method for producing high-intensity clean electricity without $CO_2$ or radioactive elements.

Description of Related Art

The planet is facing unprecedented global warming that could lead to its collapse. Global warming is mainly caused by the increase in human activities that demand enormous natural resources from our planet, which tend to exceed its capacity. These activities include the production of energy from fossil fuels, including oil, coal, uranium, etc., resulting in the emission of huge quantities of CO2, which are the main cause of the temperature rise.

The existing technologies are not able to produce enough quantity of green electricity accessible for all at every corner of the planet at affordable cost. Many people around the world don't have access to green electricity.

There is thus a need for a system and method for the generation of high-intensity clean electricity that is further wirelessly transmissible over long distances in a more efficient manner.

SUMMARY

Embodiments in accordance with the present invention provide a system for producing high-intensity electricity utilizing gravitational waves. The system not only produces high-intensity electricity but also wirelessly transmits it to distant places. The generated electrical energy is wirelessly transferable at a distance ranging from 0 to 31,000 Kilometers (km). The system produces electricity in a range of 1 to 65,000 Terawatt (TW) per year. The system produces at least 1 Terawatt (TW) of electricity per day and per plasma collision roundabouts and a total of 180 Terawatt (TW) per day for the all 187 plasma collision roundabouts.

The system includes a first quantum antenna configured to capture gravitational waves, carrying the potential energy of the sun. The first quantum antenna is a parabolic antenna. The first quantum antenna comprise a compensation plate to enhance waves frequencies and signal to use them optimally.

The system further includes a second quantum antenna configured to capture gravitational waves, carrying potential energy from sedentary supermassive black holes. The second quantum antenna is a flat antenna. The second quantum antenna comprise a compensation plate to enhance waves frequencies and signal to use them optimally.

The system further includes a plasma collision roundabout configured to allow collision of the gravitational waves, captured using the first quantum antenna and the second quantum antenna, fostering the fusion of atoms of the materials transported by each of the gravitational waves.

The system further includes a wave collision roundabout configured to merge the gravitational waves captured using the first quantum antenna and the second quantum antenna, to a fusion wave. The fusion wave is so powerful that it can be used for internet with respect to Quantum Information Technology.

The system further includes a plurality of converters connected to the plasma collision roundabout. The plurality of converters is configured to transform the intensity of the produced electric power from Watt to Volts.

The system further includes a battery connected to a plurality of converters, wherein the battery is configured to store the energy produced.

The system further includes a plurality of pylons boules configured to transmit and receive electricity. The plurality of pylons boules is connected to a second battery.

The system further includes a household pylons boule configured to receive the transferred wireless electric energy. The household pylons boule comprises an antenna, a receiver, a demodulator, a controller, a converter, and a pair of batteries.

The system further includes a control tower. The control tower is configured to control the wireless transfers of electrical energy to the plurality of the pylons boules.

Embodiments in accordance with the present invention further provide a method for producing electricity producing high-intensity electricity utilizing gravitational waves. The method includes capturing a plurality of gravitational waves using the first quantum antenna, and the second quantum antenna; enabling collision of the captured gravitational antenna, in the plasma collision roundabout exploiting plasma, to release free electrons producing electrical energy; merging the captured gravitational waves, in the wave collision roundabout, to produce fusion waves; converting the produced electrical energy using the plurality of converters connected to the plasma collision roundabout, wherein the conversion is from Watt to Volts; storing and coding the converted electric power into Quantum-Read Only Memory (Q-ROM) of a battery, as electrical signals using qubits.

Embodiments of the present invention may provide a number of advantages depending on their particular configuration. First, embodiments of the present application provide a system and a method for producing high-intensity electricity and wirelessly transferring it to distant places.

Next, embodiments of the present application provide a system that enables wireless transmission of electricity over long distances ranging from 0 to 31,000 kilometers.

Next, embodiments of the present application provide a system that produces electricity and transmission without causing any harm to the health of humans, animals, plants, and objects.

Next, embodiments of the present application provide a system that produces intense permanent electricity 24 hours, 7 days, 30 days, 12 months, constantly, and for thousands of years.

Next, embodiments of the present application provide a system that produces electricity that is constant, intense, and unstoppable regardless of the alternation of seasons, of night and day, and regardless of the weather.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible by utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
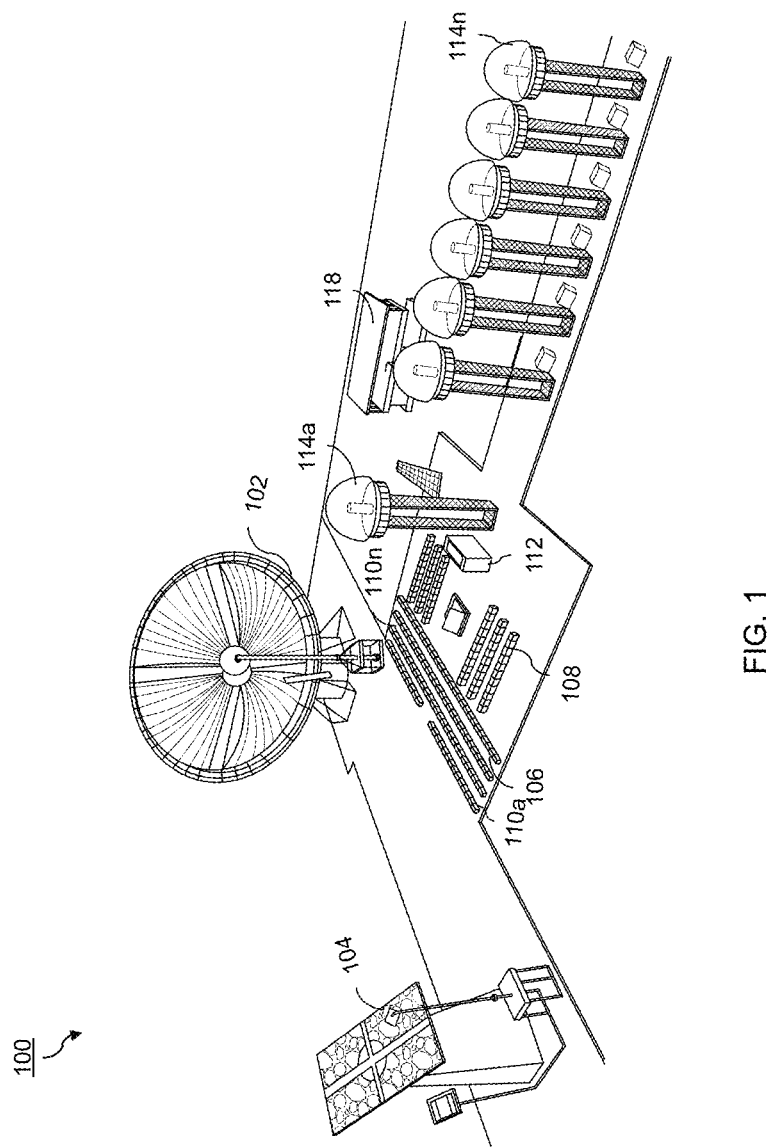
FIG. 1 illustrates a system for producing high-intensity electricity, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a", "an", and "the" designate both the singular and the plural, unless expressly stated to designate the singular only.

FIG. 1 illustrates a system 100 for producing high-intensity electricity, according to embodiments of the disclosed invention. The system 100 disclosed herein produces high-intensity electricity utilizing gravitational waves. According to embodiments of the present invention, the system 100 utilizes the gravitational waves captured from the solar system, more precisely, from the interaction between the earth, the sun, and the supermassive and sedentary black hole. The sun, the earth, and the black hole interact with each other through gravitational forces, but not limited to, a force $\vec{F}_s$ generated by the sun, a force $\vec{F}_t$ generated by the earth, and a force $\vec{F}_n$ generated by the black hole. These waves not only enable the generation of electricity, but also they are wirelessly transmissible over long distances ranging from 0 to 31,000 km/s, without causing any harm to the health of humans, animals, plants, and objects. The system 100 produces electricity that is not free energy access, consumers will have access, to abundant electricity at lower costs. According to embodiments of the present invention, the system 100 is a cost-recovery system to collect or build up capital to support other ecological projects to protect the planet. Further, the system 100 comprises a first quantum antenna 102, a second quantum antenna 104, a plasma collision roundabout 106, a wave collision roundabout 108, a plurality of converters 110a-110n, a battery 112, a plurality of pylons boules 114a-114n, a household pylon boule 116, and a control center 118.

The first quantum antenna 102 (shown in FIG. 2) may be configured to capture gravitational waves carrying the potential energy of the sun, according to embodiments of the present invention. In a preferred embodiment of the present invention, the first quantum antenna 102 may be a parabolic antenna. Similarly, the second quantum antenna 104 (shown in FIG. 3) may be configured to capture the gravitational waves carrying the potential energy from sedentary supermassive black holes. In a preferred embodiment of the present invention, the second quantum antenna 104 may be a flat antenna.

According to embodiments of the present invention, the first quantum antenna 102 and the second quantum antenna 104 capture the gravitational waves from the sun and the sedentary supermassive black holes, respectively. The system 100 may be configured to combine the gravitational waves projected by both the sun and the sedentary black hole into fusion wave ($O_{eth}$) waves that are responsible for the production and transport of high-intensity electricity.

Both of the captured gravitational waves, from the sun or the sedentary black hole, have very low frequencies. The gravitational waves from the sun and the sedentary black hole have a frequency of $115.10^{-7}$ HZ et $317.10^{-11}$ Hz respectively. At these low frequencies, these waves are unusable and further referred to as rigid. Further, the frequencies are increased to optimize their signals. According to embodiments of the present invention, the first quantum antenna 102 and the second quantum antenna 104 each comprise compensation plates to enhance waves frequencies and signal to use them optimally. Below is the calculation used to deduce the increased frequencies of the captured gravitational waves.

Calculation of Increased Frequencies
Increased or Compensated Frequency of Waves Coming from the Black Hole $$de\ \overline{O}|\vec{f}_n|$$

$$Fnm = \frac{Coefzn}{fn^2} \times f_0 \times Co\ donc$$

$$Fmn = \frac{36.100 \cdot 10^{-14}}{(0.317 \cdot 10^{-7})^2} \times 1.65 \times 1\ HZ,$$

hence, $$Fcn = 593.27\ kHZ$$

Increased or Compensated Frequency of Waves Coming from the Sun $$de\ \overline{O}|\vec{F}_s|$$

$$Fms = \frac{Coefzs}{fs^2} \times f_0 \times Co,$$

hence, $$Fms = \frac{55.917 \cdot 10^{-14}}{(115 \cdot 10^{-7})^2} \times 1.65 \times 1\ HZ\ donc$$

$$Fcs = 6.6\ HZ$$

After calculation, the frequency of the gravitational wave signals from the sun is raised to 6.6 HZ or approximately 7 HZ, which is optimal and the waves are less rigid and therefore easily usable.

After, calculation the frequency of the gravitational wave signals from the sedentary supermassive black hole is raised to 593.7 kHz, which is largely optimal, largely less rigid, and perfectly usable.

Figure 2:
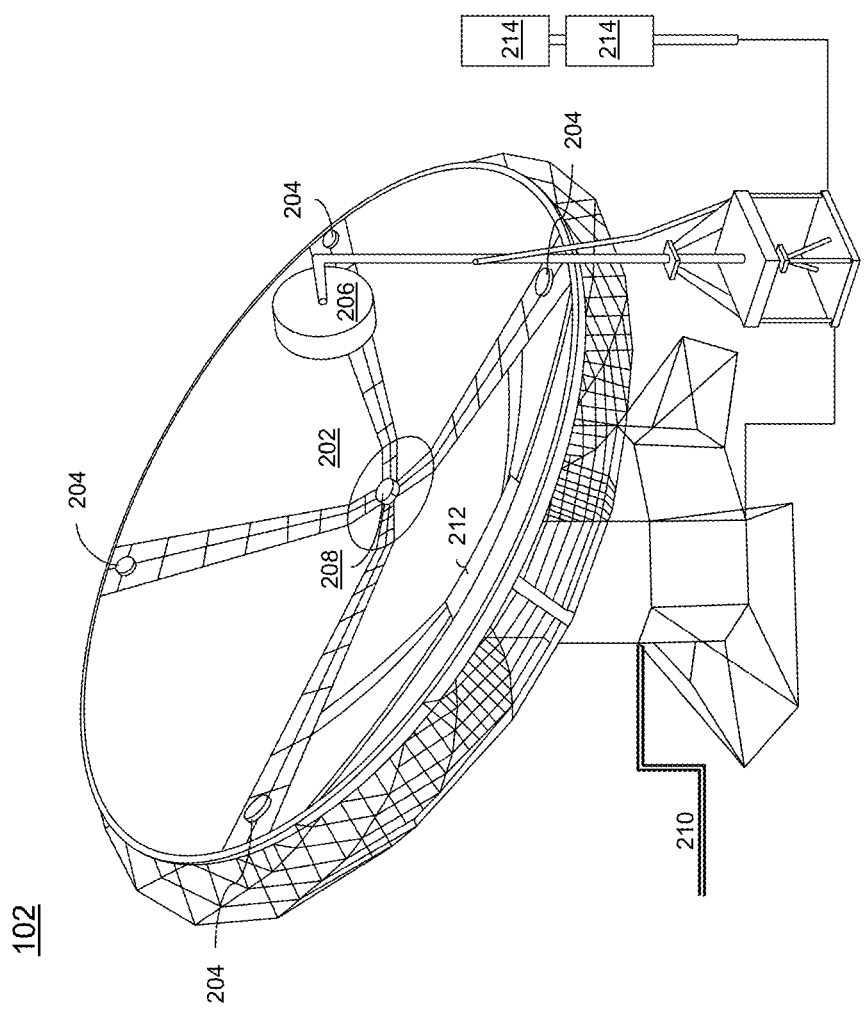
FIG. 2 illustrates a first quantum antenna, according to an embodiment of the present invention.

FIG. 2 illustrates the first quantum antenna 102, according to an embodiment of the present invention. The first quantum antenna 102 is parabolic and has a silver (carat) semi-reflecting mirror rings 202 on its surface. In addition to the mirror rings 202, the first quantum antenna 102 has four 5 cm diameter laser eyelets 204 located at the four corners of the dish's periphery. The laser eyelets 204 is connected to a small high guiding antenna 206 to enhance tracking and capture. According to embodiments of the present invention, the guiding antenna 206 is 15 to 20 centimeters (cm) in height. The laser eyelets 204 and the small guiding antenna 206 is connected to a 17 cm diameter sensor 208 placed in the center of the dish at the bottom of the concave.

Further, the first quantum antenna 102 comprises guide wires 210, a compensation plate 212, and a pair of screens 214. The guide wires 210 may be connected to the plasma collision roundabout 106, according to embodiments of the present invention. The pair of screens 214 may be configured to read, but not be limited to, wave signals, atmospheric pressure, and temperature to measure the amount of heat transported by the waves. The first screen reader is placed on the first quantum antenna 102 before the compensation plate 212 to read the information immediately after the capture. Similarly, the second screen is placed after the compensation plate 212 to read the information after the rigidity of these waves has been lifted or reduced. The rigidity of these waves is deduced using the calculation mentioned in FIG. 3.

Furthermore, the first quantum antenna 102 may be designed with a height ranging from 8 to 10 meters and with a disk diameter of 7 meters. According to embodiments of the present invention, the first quantum antenna 102 may be placed in the East to West orientation.

Figure 3:
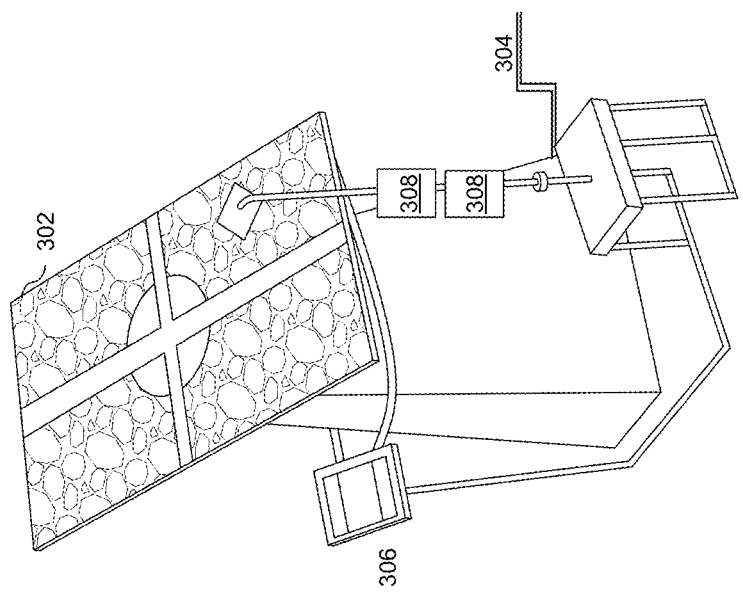
FIG. 3 illustrates a second quantum antenna, according to an embodiment of the present invention.

FIG. 3 illustrates the second quantum antenna 104, according to embodiments of the present invention. The second quantum antenna 104 is a rectangular-shaped antenna. The dish 302 of the second quantum antenna 104 is 8 to 10 meters long. The dish 302 of the second quantum antenna 104 is 5 meters wide. Further, similar to the first quantum antenna 102 the second quantum antenna 104 has its orientation from South to North.

Further, the second quantum antenna 104 comprises guide wires 304, a compensation plate 306, and a pair of screens 308. The guide wires 304 may be connected to the plasma collision roundabout 106, according to embodiments of the present invention. The pair of screen 308 may be configured to read, but not be limited to, wave signals, atmospheric pressure, and temperature to measure the amount of heat transported by the waves. The second screen reader is placed on the second quantum antenna 104 before the compensation plate 306 to read the information immediately after the capture. Similarly, the second screen is placed after the compensation plate 306 to read the information after the rigidity of these waves has been lifted or reduced.

The captured gravitational waves by the first quantum antenna 102 and the second quantum antenna 104 are modulated by means of a ZOUWEYE coefficient (Coefz). According to embodiments of the present invention, three ZOUWEYE coefficients are deduced using the below-mentioned calculations:

Coefficient Related to the Gravitational Waves Resulting from Collusion Between the Waves Coming from the Sun and the Black Hole (Coefz)

$$Coefz = Ms\frac{2G}{C^4} \times 188,$$

$$Coefz = 1989 \cdot 10^{30}\ kg \times 1.65 \cdot 10^{-44}/m^{-1}/kg^{-1}/S^2) \times 188 = 616.987 \cdot 10^{-14}$$

Coefficient Related to the Gravitational Waves Projected by the Sun Against the Earth (Coefzs)

$$Coefzs = Ms\frac{2G}{C^4} \times 17, Pimp = 17,$$

hence, $$Coefzs = 1989 \cdot 10^{30}\ kg \times 1.65 \cdot 10^{-44}/m^{-1}/kg^{-1}/S^2) \times 17$$

$$Coefzs = 55.791 \cdot 10^{-14}$$

Coefficient Related to the Gravitational Waves Projected by the Black Hole Against the Earth (Coefzn)

$$Coefzn = Ms\frac{2G}{C^4} \times 11, Pimp = 11,$$

hence, $$Coefzn = 1989 \cdot 10^{30}\ kg \times 1.65 \cdot 10^{-44}/m^{-1}/kg^{-1}/S^2) \times 11 = 36.100 \cdot 10^{-14}$$

Calculation of Modulated Frequencies

Modulated Frequency of $\vec{O}|\vec{F}_n|$ $$Fnm = \frac{Coefzn}{fn^2} \times f_0 \times Co,$$

hence, $$Fmn = \frac{36.100 \cdot 10^{-14}}{(0.317 \cdot 10^{-7})^2} \times 1.65 \times 1 \text{ HZ } donc$$

$$Fmn = 593.27 \text{ kHZ}$$

Modulated Frequency of $\vec{O}|\vec{F}_s|$ $$Fms = \frac{Coefzs}{fs^2} \times f_0 \times Co \text{ donc}$$

$$Fms = \frac{55.917 \cdot 10^{-14}}{(115 \cdot 10^{-7})^2} \times 1.65 \times 1 \text{ HZ},$$

hence, $$Fms = 6.6 \text{ HZ}$$

Figure 4:
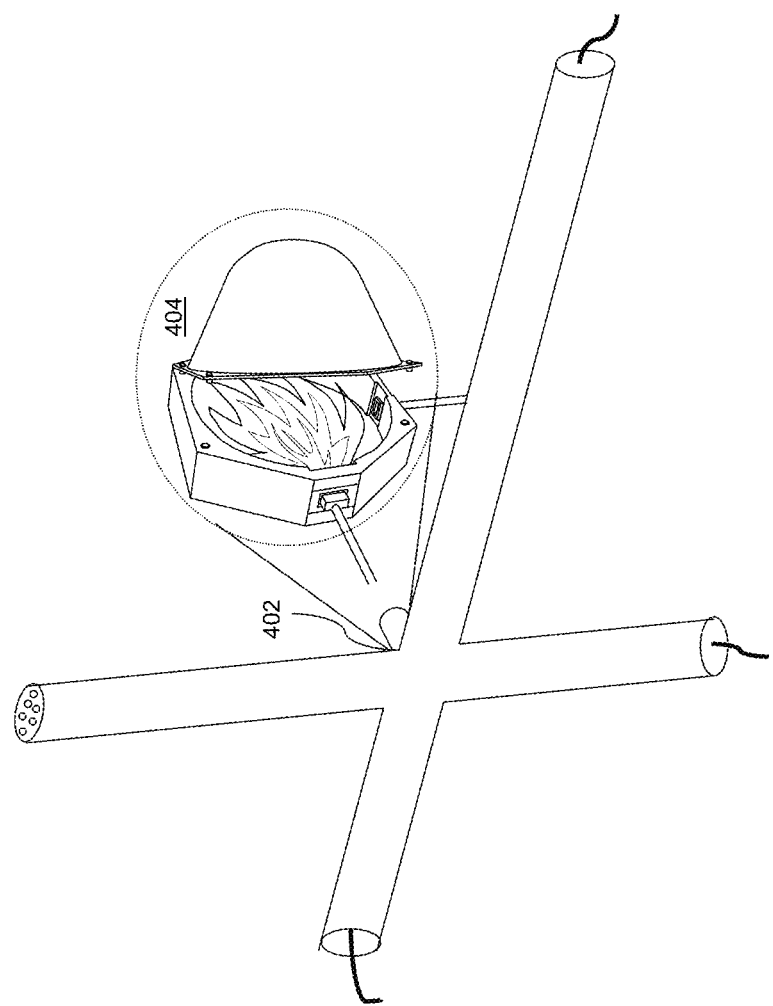
FIG. 4 illustrates a plasma collision roundabout, according to an embodiment of the present invention.

FIG. 4 illustrates a plasma collision roundabout 106, according to an embodiment of the present invention. The plasma collision roundabout 106 may be configured to allow collision of the gravitational waves, captured using the first quantum antenna 102 and the second quantum antenna 104, fostering the fusion of atoms of the materials transported by each of the gravitational waves. The collision takes place on a pop shelf 402 and causes a highly heated environment similar to a furnace with temperatures reaching millions of degrees Celsius, releasing huge quantities of free electrons.

The gravitational waves from the sun carry a combination of materials, namely, enormous heat, quantities of highly concentrated bodies, or many electrons. Similarly, the gravitational waves from the sedentary supermassive black hole, on the other hand, carry cold mass-like material, a material whose atoms have many electrons and high atmospheric pressure.

The plasma collision roundabout 106 comprises the pop shelf 402, according to embodiments of the present invention. The pop shelf 402 comprises a plurality of furnaces 404a-404n (hereinafter referred to as furnace 404). In a preferred embodiment of the present invention, the plasma collision roundabout 106 consists of at least 187 furnaces. In another embodiment of the present invention, the plasma collision roundabout 106 consists of a max of 187 furnaces 404. The plasma generates between 6,000 and 11,000 Degrees Celsius (° C.). The pop shelf 402 produces between 1,000,000 to 2,000,000 Degrees Celsius (C). Since, the plasma collision roundabout 106 comprising 187 pop shelf 402, generates between 187,000,000 and 300,000,000 Degrees Celsius (° C.).

Figure 5:
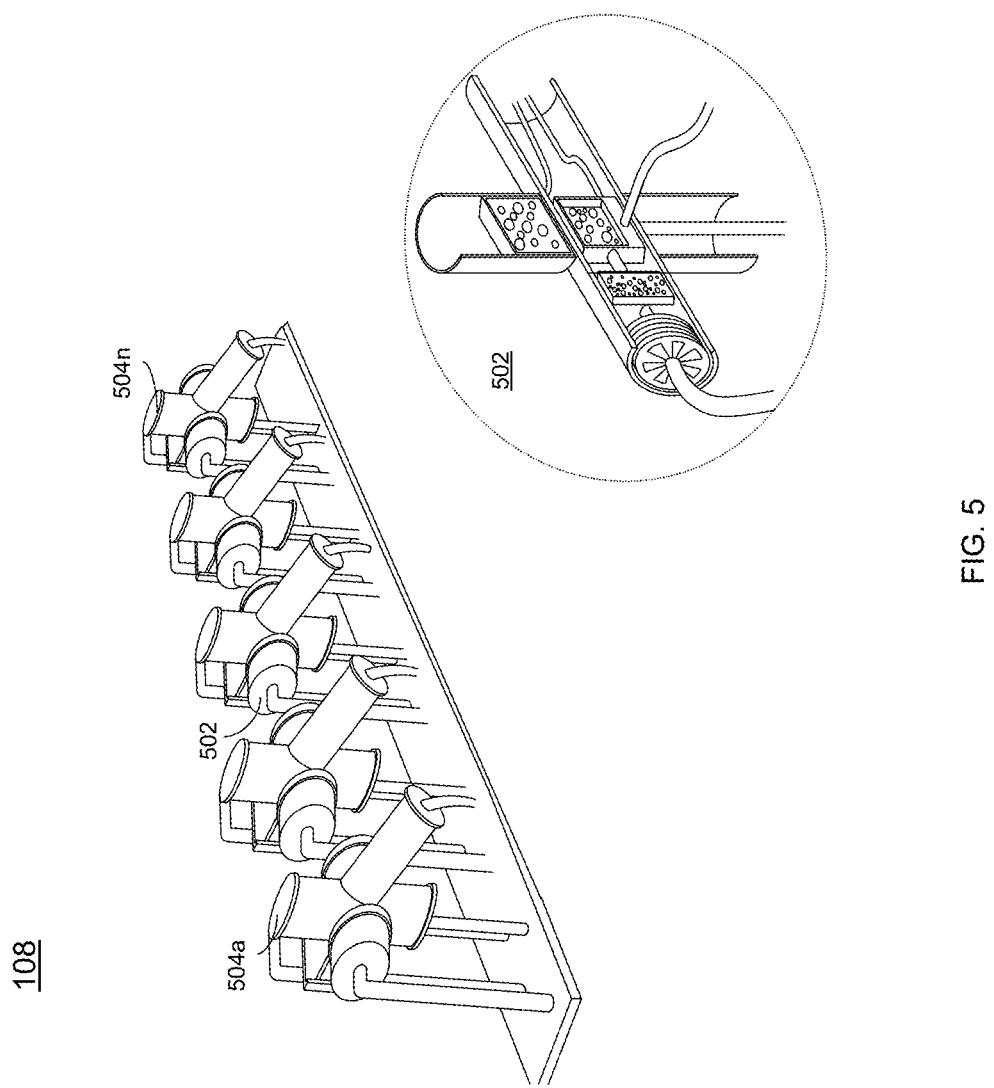
FIG. 5 illustrates a wave collision roundabout, according to an embodiment of the present invention.

FIG. 5 illustrates a wave collision roundabout 108, according to an embodiment of the present invention. The wave collision roundabout 108 may be configured to merge the gravitational waves captured using the first quantum antenna 102 and the second quantum antenna 104. In a preferred embodiment of the present invention, the wave collision roundabout 108 merges the gravitational waves captured using the first quantum antenna 102 and the second quantum antenna 104 to produce a fusion (Oeth) wave.

Likewise, the plasma collision roundabout 106, and the wave collision roundabout 108 comprise a pop shelf 502. The pop shelf 502 has an oxygen-impregnated environment. The pop shelf 502 further comprises a plurality of pimps 504a-504n (hereinafter referred to as pimp 504). The pimp 504 may be 187 in number that combinedly produces the fusion wave.

Figure 6:
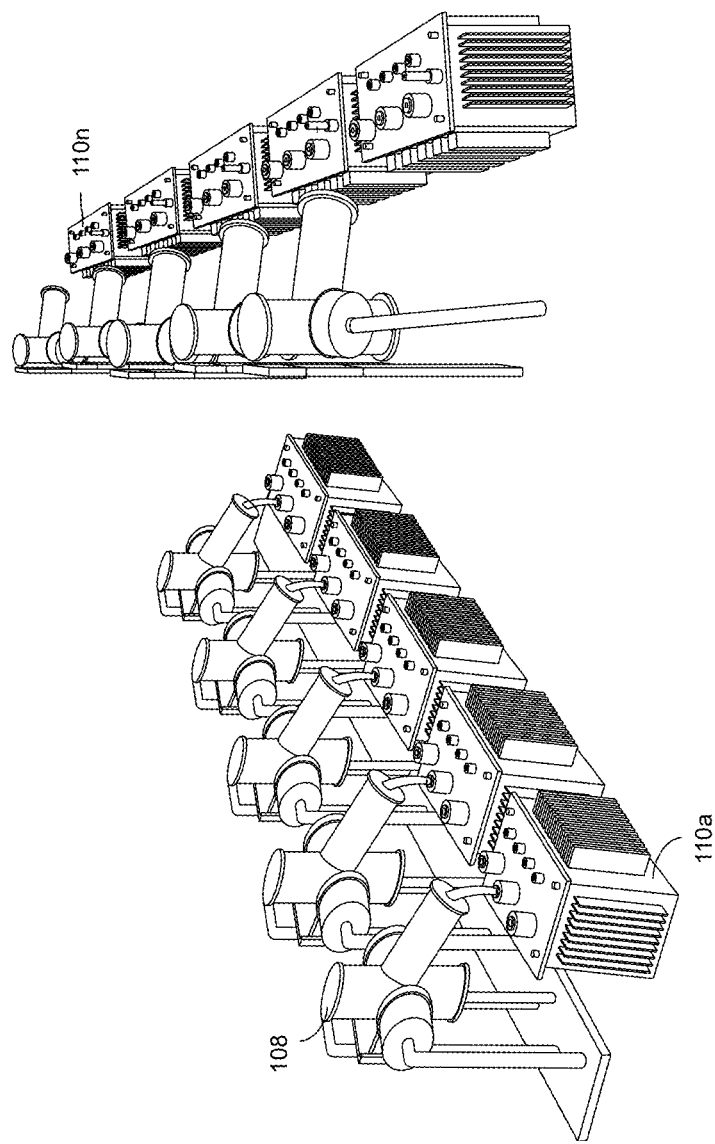
FIG. 6 illustrates a plurality of the converters, according to an embodiment of the present invention.

FIG. 6 illustrates the plurality of the converters 110a-110n, according to the embodiments of the present invention. The plurality of converters 110a-110n (hereinafter referred to as converters 110) may be configured to transform the intensity of the produced electric power. The plurality of converters 110 may be configured to transform the intensity of the produced electric power from Watt to Volts. According to embodiments of the present invention, the converter 110 may be connected to each of the plasma collision roundabouts 106. In a preferred embodiment of the present invention, each of 187 plasma collision roundabout 106 may be connected to 187 converters 110.

Further, the total annual production of the system 100 is about 65,000 Terawatt/year, that too when all 187 roundabouts are put together. According to an embodiment of the present invention, the roundabouts produce 346 to 348 Terawatt per year. According to another embodiment of the present invention, the roundabouts produce 0.96 Terawatt per day. The converter 110 may be configured to transform 5 Tera volts.

In an exemplary scenario, the system 100 may be designed to produce 180 Terawatt equivalent to 893 Teravolts. In another exemplary scenario, the system 100 may be designed to produce 5,402 Terawatts equivalent to 26,790 Teravolts. In yet another exemplary scenario, the system 100 may be designed to produce a total of 65,424 Terawatts equivalent to 318,096 Teravolts in a year.

Figure 7:
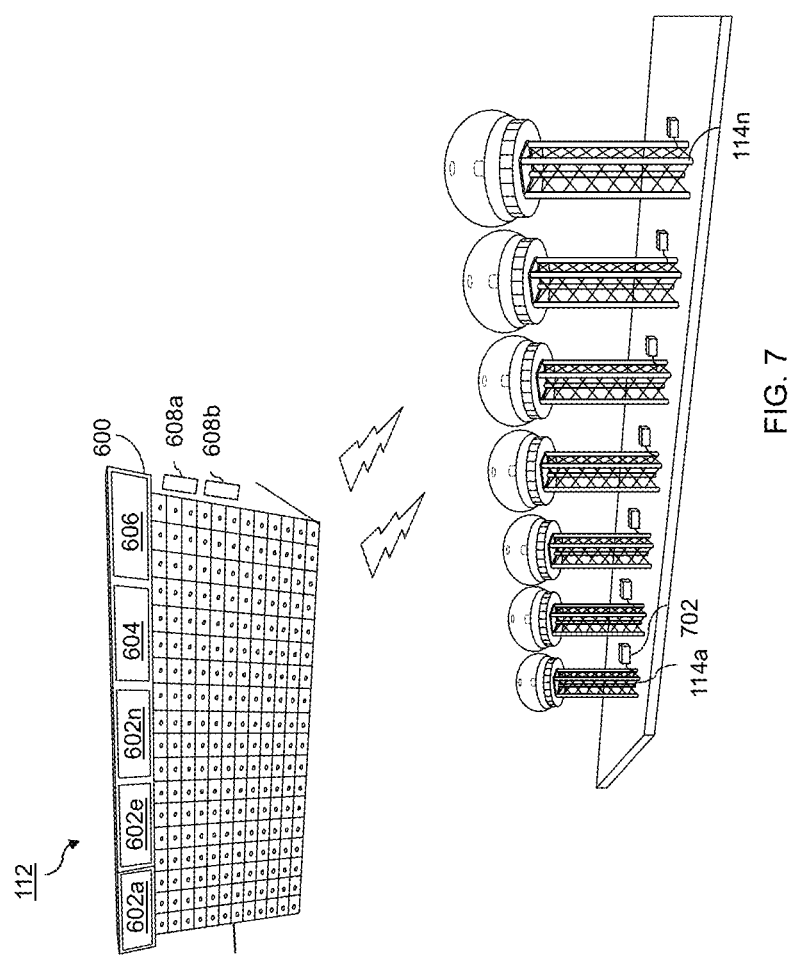
FIG. 7 illustrates a battery, according to an embodiment of the present invention.

FIG. 7 illustrates a battery 112, according to embodiments of the present invention. The battery 112 may be configured to store the energy produced, according to an embodiment of the present invention. The battery 112 may be configured to store the electricity through a recharging mechanism. The battery 112 may also be configured to code the stored electricity through Q-ROM. The battery 112 may also be configured to wirelessly transmit the electricity to the pylons boules 114a-114n. The mega lithium battery is a rechargeable battery. The battery 112 is 1.70 meters high and 1.20 meters long. Further, the battery 112 has 187 cathodes and 187 anodes. The cathode and anodes are each 1.1 meters long and 0.11 meters in diameter.

The cathodes are made of lithium iron phosphate combined with fayalite to boost or promote rapid recharging through wave circulation. The fayalite contained in the cathodes plays a catalytic role in the recharging process. The anodes are made up of graphite.

The electrolyte to be efficient and CO2 free or with a very small amount of CO2 can be made with a salt solution extracted from Fayalite by purification or by sodium silicate solution. It can also be made using simple salt combined with salt from Fayalite.

Further, the battery 112 comprises a user interface 600, a plurality of current meters 602a-602n, a $CO_2$ meter 604, and a radioactive meter 606. The plurality of current meters 602a-602n (hereinafter referred to as current meters 602) are capable of sensing current in, but not limited to, Terawatt hour (TWh), Gigawatt hour (GWh), Megawatt hour (MWh), Kilowatt hour (KWh), and Volts. Further, the Co2 meter 604 may be configured to sense the carbon dioxide content generate during electricity generation. Similarly, the radioactive meter 606 may be configured to sense the level of radioactive materials.

In another embodiment of the present invention, the user interface 600 is equipped with an operating system. The operating system is an augmented version of the motherboards used in smartphones. The battery 112 is further equipped with a plurality of Read Only Memory (ROM) 608a-608b. The first ROM 606a may be configured to perform data processing of the data, such as, but not limited to, alphanumeric, sounds, images, and so forth. The second ROM 608b may be configured to code and store the electricity in form of quantum information (Q-bits). Further, the user interface 600 is used to transfer electricity wirelessly to distant locations using one of a service, not limited to, an Intense Energy Transfer Service (IETS), an Intense Power Transfer Service (IPTS), and so forth.

The free electrons enter the battery through the positively charged poles also known as anodes and move toward the cathodes. The process is performed in each of the 187 anodes as well as 187 cathodes. Further, because of this movement from anode to cathode the electricity is deviated, coded, and stored in the Q-ROM 608b. In a preferred embodiment of the present invention, the free electrons are coded or anesthetized and are further transferred without wires and any electricity in the air.

The battery 112 may be connected to the plurality of pylons boules 114a-114n, according to embodiments of the present invention. The plurality of pylons boules 114a-114n (hereinafter referred to as pylons boules 114) is connected to the battery 112. The plurality of pylons boules 114 may be configured to receive electricity. According to embodiments of the present invention, the pylons boules 114 may be configured to receive electricity from the battery 112. Further, the pylons boules 114 may be configured to transmit electricity to distant places.

Furthermore, the pylons boules 114 are also configured to increase the speed of the waves from 300,000 km/s to 600,000 KM/s during the transfer of electricity. The pylons boules 114 are also configured to increase the speed of the waves from 300,000 km/s to 400,000 KM/s during the transfer of electricity. The pylons boules 114 are also configured to increase the speed of the waves from 300,000 km/s to 500,000 KM/s during the transfer of electricity. The pylons boules 114 are avoid losses during the transfer which means that the quantities of electricity transferred at the beginning remain the same on the arrival and without any deformation. The pylons boules 114 are also configured to strengthen the isolation or anesthesia of free electrons (electricity) during the transfer making zero risk of electrocution in the air.

The pylons boules 114 are simple pylons mounted with glass bubbles 700. The system 100 has at least seven pylons boules 114 distributed according to the administrative delimitation in the countries. Further, each of the pylons boules 114 are connected to a second battery 702. The second battery 702 may be configured of storing about 300,000×10$^5$ teravolts.

Figure 8:
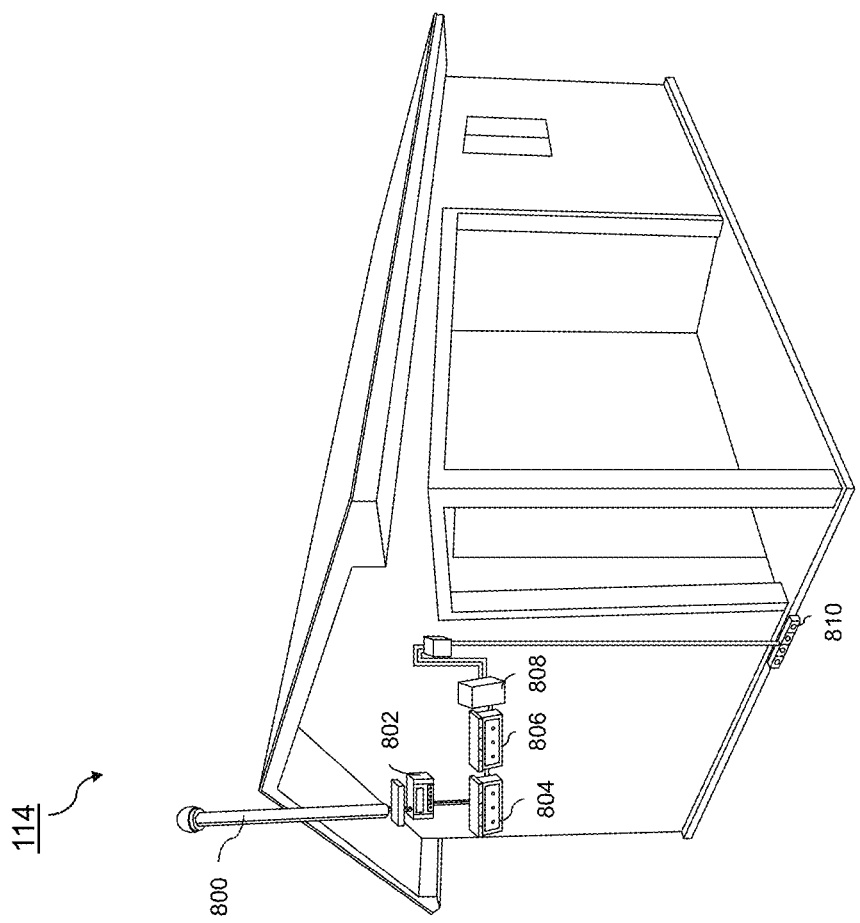
FIG. 8 illustrates a household pylons boules, according to an embodiment of the present invention.

FIG. 8 illustrates the household pylons boule 116, according to embodiments of the present invention. The household pylons boule 116 is in communication with the pylons boule 114. According to embodiments of the present invention, the household pylons boule 116 may be configured to receive the transferred wireless electric energy. The household pylons boule 116 may be installed inside the house. The household pylons boule 116 may be installed outside the house. The household pylons boule 116 may be installed anywhere in the house. Further, the household pylons boule 116 comprises an antenna 800, a receiver 802, a demodulator 804, a controller 806, a converter 808, and a pair of batteries 810.

The wirelessly transmitted anesthetized electricity arrives in a house via the antenna 800 installed on a roof, which transmits it to the decoder 804 which will demodulate it. These awakened free electrons are passed through the controller 806 to ensure that they have become an electrical power again before being transmitted to the batteries 810 where they are stored and sent to a circuit breaker to supply the house, through a converter 808.

Figure 9:
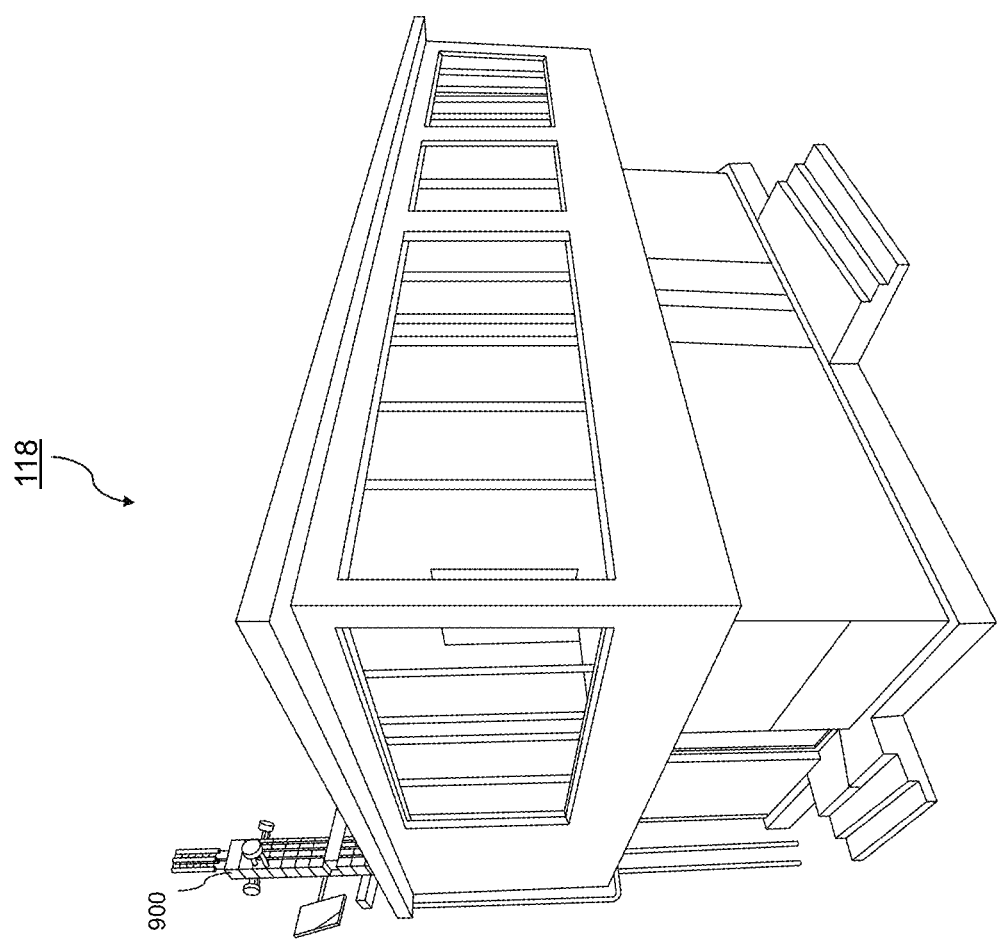
FIG. 9 illustrates a control center, according to an embodiment of the present invention.

Further, all the operations of the components such as the first quantum antenna 102, the second quantum antenna 104, the plasma collision roundabout 106, the wave collision roundabout 108, the plurality of converters 110, the battery 112, the plurality of pylons boules 114, the household pylons boule 116, are controlled through the control center 118 (shown in FIG. 9). The control center 118 uses an antenna 900 for the wireless transfer of the coded electric power to the plurality of the pylons boules (114a-114n). The control center 118 utilize an operating system installed in a user device.

Figure 10:
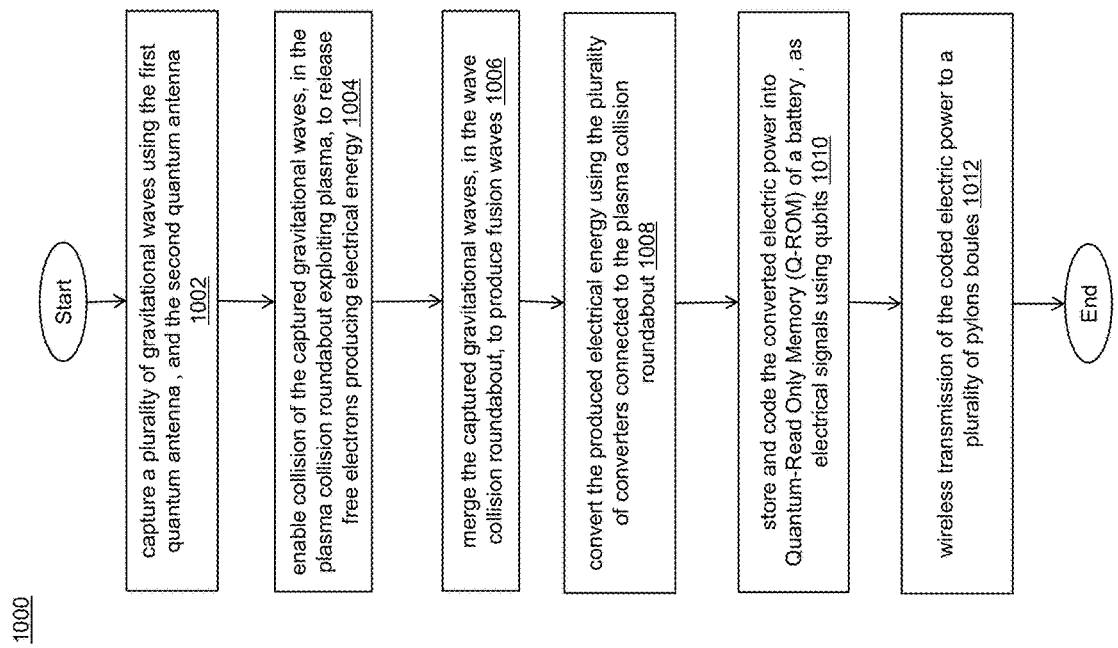
FIG. 10 depicts a method for producing electricity producing high-intensity electricity utilizing gravitational waves using the system, according to an embodiment of the present invention.

FIG. 10 depicts a method 1000 for producing electricity producing high-intensity electricity utilizing gravitational waves using the system 100, according to embodiments of the present invention.

At step 1002, a plurality of gravitational waves is captured using the first quantum antenna 102, and the second quantum antenna 104.

At step 1004, a collision of the captured gravitational waves is enabled in the plasma collision roundabout 106 exploiting plasma. The collision of the captured gravitational waves releases free electrons producing electrical energy.

At step 1006, the captured gravitational waves are merged in the wave collision roundabout 108. The merging of the captured gravitational waves produces fusion waves.

At step 1008, the produced electrical energy is converted using the plurality of converters 110 connected to the plasma collision roundabout 106. The conversion inside the converters 110 takes place from Watt to Volts.

At step 1010, the converted electric power is coded and stored in the Quantum Read Only Memory (Q-ROM) 608b of a battery 112. The conversion into quantum bits from electrical signals is performed in the battery 112.

At step 1012, the coded electric power is wirelessly transferred to the plurality of pylons boules 114 through cellular relay antennas of the control tower 118. Further, the wireless transfer of the coded electric power, to distant locations, is performed using one of, but not limited to, an Intense Energy Transfer Service (IETS), an Intense Power Transfer Service (IPTS), and so forth.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special-purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims and may include other examples that occur to those skilled in the art. Such other examples are intended to be within the scope of the claims if they have structural elements that do not differ from the literal language of the claims, or if they include equivalent structural elements within substantial differences from the literal languages of the claims.

We claim:

1. A system for producing high-intensity electricity utilizing gravitational waves, the system (100) comprising:
   a first quantum antenna (102) configured to capture gravitational waves, carrying the potential energy of the sun, wherein the first quantum antenna (102) is a parabolic antenna;
   a second quantum antenna (104) configured to capture gravitational waves, carrying the potential energy from sedentary supermassive black holes, wherein the second quantum antenna (104) is a flat antenna;
   a plasma collision roundabout (106) configured to allow collision of the gravitational waves, captured using the first quantum antenna (102) and the second quantum antenna ( ) fostering the fusion of atoms of the materials transported by each of the gravitational waves;
   a wave collision roundabout (108) configured to merge the gravitational waves captured using the first quantum antenna (102) and the second quantum antenna (104), to a fusion wave;
   a plurality of converters (110a-110n) connected to the plasma collision roundabout (106), wherein the plurality of converters (110a-110n) is configured to transform the intensity of the produced electric power from Watt to Volts; and
   a battery (112) connected to the plurality of converters (110a-110n), wherein the battery (112) is configured to store the energy produced.

2. The system as claimed in claim 1, the first quantum antenna (102) and the second quantum antenna (104) comprise a compensation plate (212) and a compensation plate (306) respectively, configured to enhance waves frequencies and signal to use them optimally.

3. The system as claimed in claim 1, the system (100) comprises at least 187 plasma collision roundabouts (106) capable to generate power in a range of 187,000,000 to 300,000,000 Degrees Celsius (0C).

4. The system as claimed in claim 1, the system (100) comprises at least 187 converters (110a-110n), each connected to one of the plasma collision roundabouts (106).

5. The system as claimed in claim 1, the battery (112) further comprises a user interface (600), a plurality of current meters (602), a CO2 meter (604), and a radioactive meter (606).

6. The system as claimed in claim 1, wherein the plurality of current meters (602), are capable of sensing current in, Terawatt hour (TWh), Gigawatt hour (GWh), Megawatt hour (MWh), Kilowatt hour (KWh), and Volts.

7. The system as claimed in claim 5, the battery (112) is further connected to a control tower (118), wherein the control tower (118) is configured to control the wireless transfers of electrical energy to a plurality of the pylons boules (114a-114n).

8. The system as claimed in claim 1, the system (100) further comprises a plurality of pylons boules (114a-114n) each having a second battery (702) connected to it, and a household pylons boule (116).

9. The system as claimed in claim 8, wherein the system (100) comprises at least six pylons boules (114a-114n).

10. The system as claimed in claim 8, the household pylons boule (116) comprises an antenna (800), a receiver (802), a demodulator (804), a controller (806), a converter (808), and a pair of batteries (810).

11. The system as claimed in claim 1, the system (100) is further capable of wirelessly transferring the generated energy to distant locations using one of a service, selected from, an Intense Energy Transfer Service (IETS), an Intense Power Transfer Service (IPTS).

12. The system as claimed in claim 11, wherein the generated electrical energy is wirelessly transferable at a distance ranging from 0 to 31,000 Kilometers (km).

13. The system as claimed in claim 11, wherein the maximum power capacity per transfer is 600 Megawatt per second (MW/s).

14. The system as claimed in claim 1, the system (100) produces electricity in a range of 1 to 65,000 Terawatt (TW) per year.

15. The system as claimed in claim 1, the system (100) produces at least 1 Terawatt (TW) of electricity per day and per plasma collision roundabout (106) and a total of 180 Terawatt (TW) per day for the all 187 plasma collision roundabouts (106).

16. A method for producing electricity producing high-intensity electricity utilizing gravitational waves, the method comprises:
   capturing a plurality of gravitational waves using the first quantum antenna (102), and the second quantum antenna (104);
   enabling collision of the captured gravitational waves, in the plasma collision roundabout (106) exploiting plasma, to release free electrons producing electrical energy;
   merging the captured gravitational waves, in the wave collision roundabout (108), to produce fusion waves;
   converting the produced electrical energy using the plurality of converters (110a-110n) connected to the plasma collision roundabout (106), wherein the conversion is from Watt to Volts; and
   storing and coding the converted electric power into Quantum-Read Only Memory (Q-ROM) (602b) of a battery (112), as electrical signals using qubits.

17. The method as claimed in claim 16, comprises a step of wirelessly transferring the coded electric power to a plurality of pylons boules (114a-114n).

18. The method as claimed in claim 17, wherein the wireless transfer of the coded electric power to the plurality of the pylons boules (114a-114n) takes place through an antenna (900) of the control tower (118).

19. The method as claimed in claim 17, the wireless transfer of the coded electric power to the plurality of the pylons boules (114a-114n) takes place utilizing an operating system installed in a user device of the control tower (118).

20. The method as claimed in claim 17, the wireless transfer of the coded electric power, to distant locations, is performed using one of, selected from, an Intense Energy Transfer Service (IETS), an Intense Power Transfer Service (IPTS).

\* \* \* \* \*